United States Patent
Ehrfeld et al.

(10) Patent No.: US 6,230,408 B1
(45) Date of Patent: *May 15, 2001

(54) PROCESS FOR PRODUCING MICRO-HEAT EXCHANGERS

(75) Inventors: Wolfgang Ehrfeld, Mainz; Lutz Weber, Gabsheim; Thomas Richter, Mainz; Frank Michel, Nieder-Olm, all of (DE)

(73) Assignee: Institut Für Mikrotechnik Mainz GmbH (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,303

(22) PCT Filed: Feb. 21, 1997

(86) PCT No.: PCT/EP97/00840

§ 371 Date: Sep. 3, 1998

§ 102(e) Date: Sep. 3, 1998

(87) PCT Pub. No.: WO97/32687

PCT Pub. Date: Sep. 12, 1997

(30) Foreign Application Priority Data

Mar. 7, 1996 (DE) .............................................. 196 08 824

(51) Int. Cl.[7] .................................................. B21D 53/04
(52) U.S. Cl. ................................ 29/890.039; 219/69.17; 264/293
(58) Field of Search ........................... 29/890.039, 527.5, 29/527.6; 264/219, 293; 219/69.17; 205/640

(56) References Cited

U.S. PATENT DOCUMENTS

| | | | |
|---|---|---|---|
| 3,877,961 | * 4/1975 | Tank et al. | 427/191 |
| 4,274,186 | * 6/1981 | Pringle | 29/890.039 |
| 4,392,362 | 7/1983 | Little . | |
| 4,520,252 | * 5/1985 | Inoue | 219/69.17 |
| 5,055,163 | 10/1991 | Bier et al. . | |
| 5,249,359 | 10/1993 | Schubert et al. . | |
| 5,489,410 | * 2/1996 | Baumgartner et al. | 264/219 |
| 5,501,784 | 3/1996 | Lessmöllmann et al. . | |
| 5,512,161 | 4/1996 | Dinglreiter et al. . | |
| 5,561,984 | 10/1996 | Godstalk et al. . | |
| 5,648,107 | * 7/1997 | Kagawa et al. | 264/293 |
| 5,678,162 | * 10/1997 | Barlow et al. | 264/219 |
| 5,741,557 | * 4/1998 | Corbin et al. | 427/469 |
| 5,775,187 | * 7/1998 | Nikolai et al. | 82/1.11 |
| 5,795,519 | * 8/1998 | Bacher et al. | 264/293 |

OTHER PUBLICATIONS

Patent Abstract of Japan; Publication No. 62277224, publication date Feb. 12, 1987, Applicant: Miki Puurii KK, Title: Manufacture of Fine Teeth of Solenoid Tooth Clutch.

* cited by examiner

Primary Examiner—I Cuda Rosenbaum
Assistant Examiner—Trinh Nguyen
(74) Attorney, Agent, or Firm—Hudak & Shunk Co., L.P.A.

(57) ABSTRACT

A method for fabrication of micro heat exchangers, which enable an efficient heat transfer between two flowing media. In a first processing step, a plastic layer is structurized by means of photolithography, x-ray deep lithography, or laser ablation. This plastic structure is galvanically molded in a second processing step, preserving the structural properties. The resulting metallic microstructure, which is the inverse of the original structure, is used as a shaping insert to produce the individual layers from which the micro heat exchanger is assembled. The method according to the invention makes it possible to cheaply produce large numbers of micro heat exchangers.

7 Claims, 7 Drawing Sheets

PROCESS FOR PRODUCING MICRO-HEAT EXCHANGERS

SUMMARY OF THE INVENTION

The invention concerns a method for fabrication of micro heat exchangers, in which the surfaces of single metallic layers are structured and the structured layers are stacked one on top of the other and joined together to form a micro structural body with channel-like passageways.

BACKGROUND OF THE INVENTION

Heat exchangers find application in chemical and process engineering for the transfer of heat between two media. The known plate type heat exchangers consist of a plurality of profiled sheets, which are assembled into a sheet pack. The wall thickness of the individual sheets, for strength reasons, is generally 0.4 to 0.8 mm. The sheet packs are mounted in a frame and clamped together with several tightening screws.

The heat-transferring media are guided through four plate openings at the corners of the sheets. Every two openings are alternately sealed off from the rest of the flow space so that the two media alternately flow through the intervals between the plates. By closing off individual passageways, it is possible to collect up all plates or certain plate packs in succession, in order to achieve a multiple path design (VDI Heat Atlas, 7thEd., 1994, Ob 18, 19).

There are familiar heat exchangers which work by the counterflow principle. Moreover, heat exchangers with a cross flow design are known.

Miniaturization of heat exchangers enables an enlargement of the outer surfaces available for heat exchange processes as compared to the total volume of the media flow. In this way, high capacities of heat transfer between the media are achieved.

A method for fabrication of fine structure bodies such as heat exchangers is known from DE 37 09 278 A1, in which grooves with constant cross section along their length are introduced into the surface of clarnpable metal foils and the foils are layered one on top of the other and joined together to form a microstructure body with channel-like passageways. In the known method, the grooves are worked into the foils with shaping diamonds. The method is not suitable for fabrication of microstructures with very large aspect ratios, i.e., the ratio between the height of the structure and its lateral dimensions, or structures with low surface roughness. Moreover, a free lateral structurizability is not provided, since the shaping diamonds can only form grooves with constant cross section along their length.

DE 39 15 920 A1 describes a micro heat exchanger with two layers of semiconductor material structured by etching. As a drawback, it turns out that metals are not accessible to this structurization.

DETAILED DESCRIPTION OF THE INVENTION

The purpose of the invention is to indicate a method which allows one to cheaply produce micro heat exchangers in large numbers.

This purpose is accomplished, according to the invention, with the features of Patent claim 1, as well as Patent claim 2.

In a first processing step, a structurization which is a positive or negative image of the structurization of the individual layers is worked into a body. On the surface of this body, a galvanic layer is deposited in a second step. In a variant of the method, the resulting metallic microstructure, which is the negative of the original structure, is used as a shaping insert. In a second process variant, the resulting metallic microstructure, which is the negative of the original structure, is used as an electrode in an electroerosion method. In this case, the structurization of the electrode is copied in a metallic layer. The resulting metallic layer, structurized inversely to the structurization of the electrode, is used as a shaping insert. In a last step, the individual layers are shaped with the shaping insert obtained by the first or second process variant and assembled to produce the microstructure body of the heat exchanger.

The advantage of this method lies in that different materials can be used for the fabrication of the first structurization and for the shaping insert. The first structurization can occur, for example, in easily workable plastic. According to the first process variant, the shaping insert can then be produced galvanically in a hard metal alloy. According to the second process variant, the electrode used for the spark erosion machining can be galvanically deposited and this electrode can then be copied in a hard metal alloy.

The advantage of the galvanic shaping consists in that the properties of the starting structure, such as dimension, precision, and surface roughness, remain intact. A high dimensional precision is of advantage, because it enables channels with very small dimensions, i.e., a high surface/volume ratio. Furthermore, the thickness of the walls between the channels can be considerably reduced, which ensures a high heat transfer rate. This is especially important for micro heat exchangers, in which the heat transfer occurs within the individual layers. Little surface roughness and high structural precision is advantageous, because it reduces in particular the flow resistance in small channels.

The second process variant is of advantage inasmuch as the electroerosion method can produce hard metal embossing stamps, e.g., for the embossing of aluminum, which have a long lifetime, since the stamp made from hard metal has little wear.

The structurization can be rather easily worked into a plastic body or the plastic layer of a plastic-coated body. Yet it is also possible, in theory, to work the structurization into a metallic body. The thickness of the plastic body or the thickness of the plastic layer depend on the structurization method.

When it is only necessary to create low structural height up to around 100 $\mu$m and/or when less demands are placed on the precision, the body is structured by a photolithography process. In the familiar photolithography process, the body is coated with a photoresist and a mask is deposited on the body. Next, the photoresist is exposed to UV light. The physical and chemical changes in the photoresist allow a selective development and, thus, formation of the structurization in the body.

Yet the structurization can also be incorporated in the body by an x-ray deep lithography method. In the known x-ray deep lithography method, an x-ray resist is exposed to x-rays. The changes in the x-ray resist will be confined to an exact region by virtue of the highly parallel x-ray light and less diffiaction at the mask because of the small wavelength and thus enable a more selective development as compared to photolithography. The structure created in this way, besides having high precision in the submicrometer range, also has considerably less surface relief as compared to machining processes. It is possible to achieve relatively large structural peaks up to a few millimeters. Thus, narrow walls can be created for broad channels.

A three-dimensional microstructurization, i.e., the formation of valleys of different width, as well as different depth, can be accomplished by working the body with laser light. Laser ablation does not require a development step, as with the photolithography or x-ray deep lithography method.

When the structurization is worked into the surface of a plastic body, the surface of the plastic body must be metallized before depositing the galvanic layer. The metallization can be done by high-vacuum coating.

Preferably, the body is a substrate provided with a metallic layer and a plastic cover layer, and the structurization is incorporated into the plastic layer such that the metal layer is exposed at the bottom of the valleys. The galvanic layer can then be deposited on the exposed metal layer in the valleys. After filling the valleys, the surface of the body is metallized and a galvanic cover layer is deposited onto the surface of the body. According to the first process variant, the galvanically deposited body obtained in this way is used as a shaping insert. According to the second process variant, the galvanically deposited body serves as the electrode in a spark erosion process for structurization of preferably a hard metal body. The body so structured is used as the shaping insert.

The forming of the individual layers is done preferably by metal powder injection molding. In the familiar metal powder injection molding (PM) method, the shaping insert on an injection molding machine is filled with a metal powder embedded in a polymer matrix and after shape stability is achieved the mold is removed. The particle size of the metal powder should be under 1 $\mu$m, in order to preserve structures with high precision. The resulting so-called green piece is then "debindered," i.e., the polymer matrix is removed, and sintered, creating a completely metallic piece, which forms the individual layer. The individual layers are stacked one on top of the other and joined together by gluing, diffusion welding, laser welding or sintering. But the individual layers can also be screwed or clamped together.

As an alternative, metallic materials forming the individual layers can be stamped by means of the shaping insert. In this case, preferably, one uses a metal powder embedded in a polymer matrix as the stamping material, and the shaping insert is used as the pressing stamp. After heating the stamping material, the shaping insert is pressed into the stamping material and, after achieving shape stability, removed again by cooling. By analogy with metal powder injection molding, the production of the entirely metallic piece occurs through debindering and sintering processes.

Moreover, it is possible to galvanically form the shaping insert once again.

In order to create individual layers which are structured on both their top and bottom side, a metallic foil is plastically deformed between two shaping inserts which are pressed together.

The method according to the invention shall be explained more closely hereafter, making reference to the figures.

BRIEF DESCRIPTION OF THE DRAWINGS

These show:

FIG. 1 shows a basic diagram of a micro heat exchanger produced by the method according to the invention, in counterflow design.

So as to be able to fabricate the individual layers 1, 2 in larger production runs, a structurization corresponding to the individual layer being produced is first worked into a platelike body 10.

Figure 1:
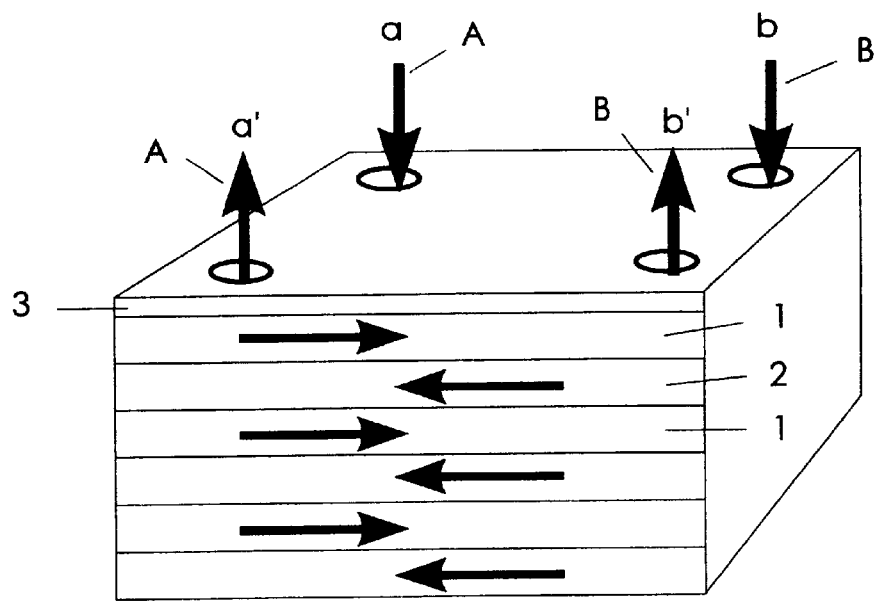
FIG. 1 a basic diagram of a counterflow type micro heat exchanger produced by the method according to the invention, FIG. 2 a cross section through the heat exchanger, transverse to the direction of flow, FIG. 3 one of the two mirror-image structured individual layers, top view, FIG. 4 the other of the two-mirror-image structured individual layers, top view, FIG. 5 the two layers one on top of the other, representing the active surface for the heat transfer, FIG. 6 a cross section through the structurized body before deposition of the galvanic layer, FIG. 7 a cross section through the structurized body, in which a galvanic layer is deposited on the exposed regions of the metal layer, FIG. 8 a cross section through the structurized body, in which the surface of the plastic cover layer of the structurized body is metallized, FIG. 9 a cross section through the structurized body, in which a galvanic layer is deposited on the surface of the body, FIG. 10 the step of forming the shaping insert for production of the individual layer, FIG. 11 the body obtained by galvanic deposition, as well as the body to be machined by an electroerosion process, FIG. 12 the body obtained by means of an electroerosion process, FIG. 13 the step of stamping a metallic layer by means of a stamping punch obtained by an electroerosion process, FIG. 14 the shaping process, in which a metal foil is plastically deformed between two shaping inserts, FIG. 15 a cross section through a micro heat exchanger with individual layers, which are structurized on both their top and bottom side, and FIG. 16 an individual layer produced by the method according to the invention, for a micro heat exchanger for gases.
Figure 2:
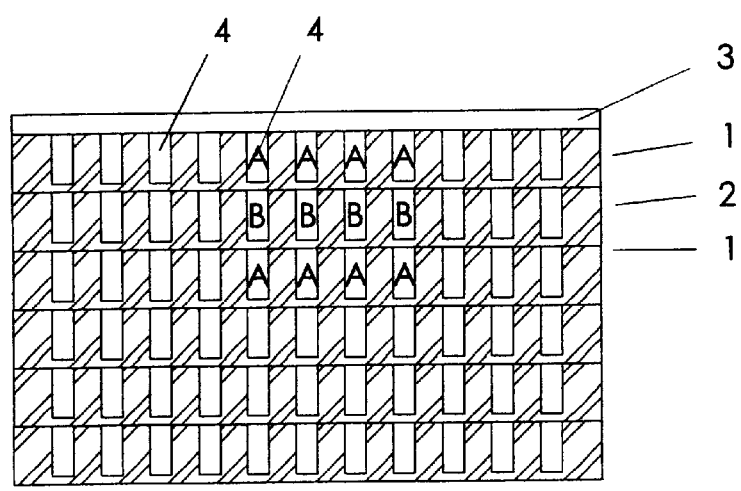
FIG. 2 shows a cross section through the heat exchanger, transverse to the direction of flow. The heat exchanger consists of individual layers 1, 2, stacked together and closed off with a cover plate 3 with fluid connections a, a'; b, b'. The individual layers 1, 2 placed on top of each other have mirror image structurization relative to each other.
Figure 3:
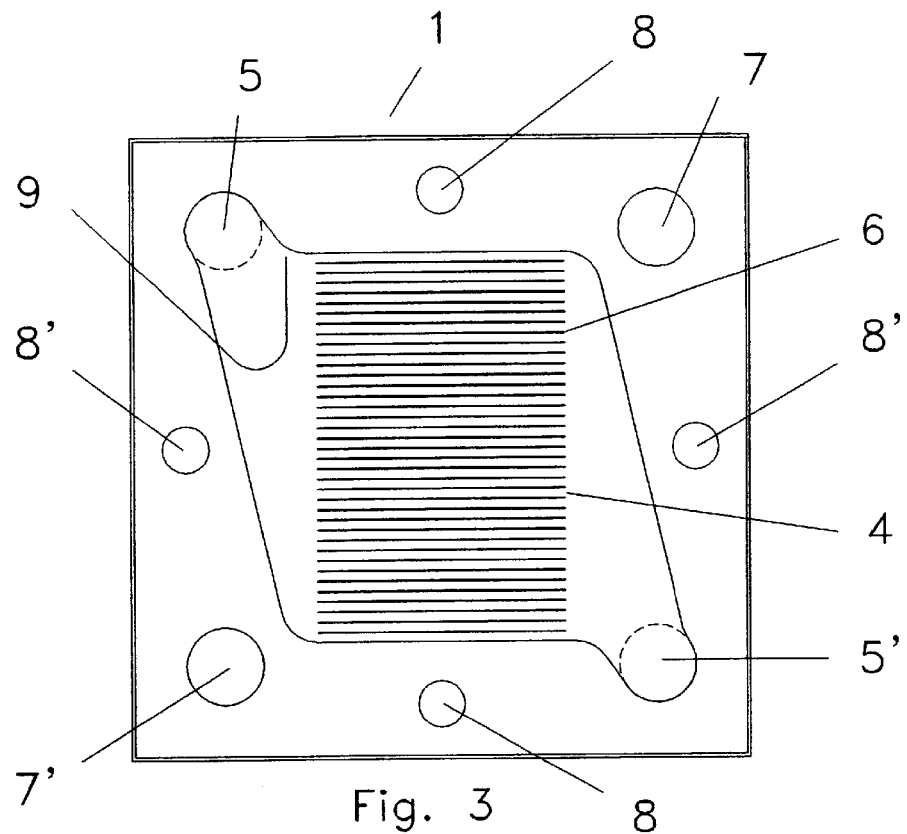
FIG. 3 shows one of the two individual layers 1, structurized by lengthwise-running grooves 4, in top view. The fluid A enters and exits the structurized layer through boreholes 5, 5' at the diagonally opposite corners upper left and lower right and becomes distributed in the fluid channels, which are separated from each other by narrow lands 6 and can have any desired lateral configuration thanks to the method of the invention. The fluid B is conveyed from the layer lying above the particular layer into the layer lying below it through boreholes at the other diagonally opposite corners 7, 7'. Additional boreholes 8, 8' in the side region of the layer 1 serve as a guide for fixation pins to orient the individual layers relative to each other.
Figure 4:
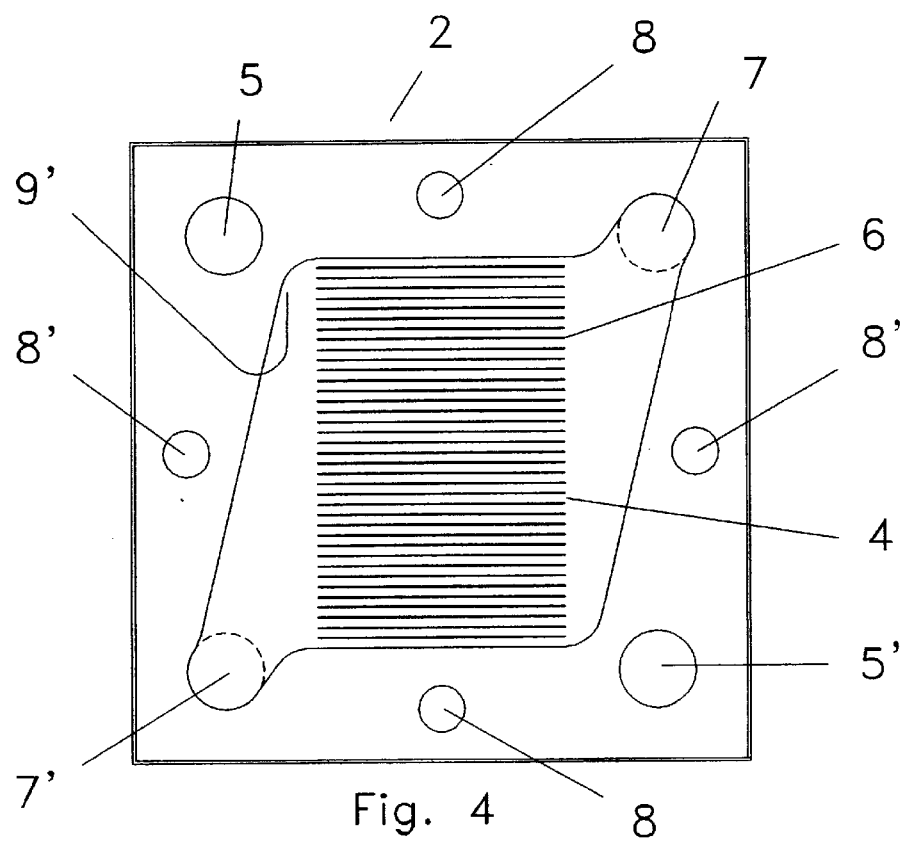
FIG. 4 shows the other of the two mirror-image structurized single layers 2, top view. Fluid B enters and leaves the structurized layer through boreholes 7, 7' at the diagonally opposite corners upper right and lower left and becomes distributed in the fluid channels 4 separated from each other by narrow lands 6. The fluid A flows into the heat exchanger through the fluid connections a, a' provided in the cover plate 3 and fluid B does so through the fluid connections b, b'. In the individual layers 1, 2, the fluids are distributed in parallel such that they are conducted in opposite flow to each other at every point. In the counterflow heat exchanger, the land structures which form the individual fluid channels lie directly on top of each other.
Figure 5:
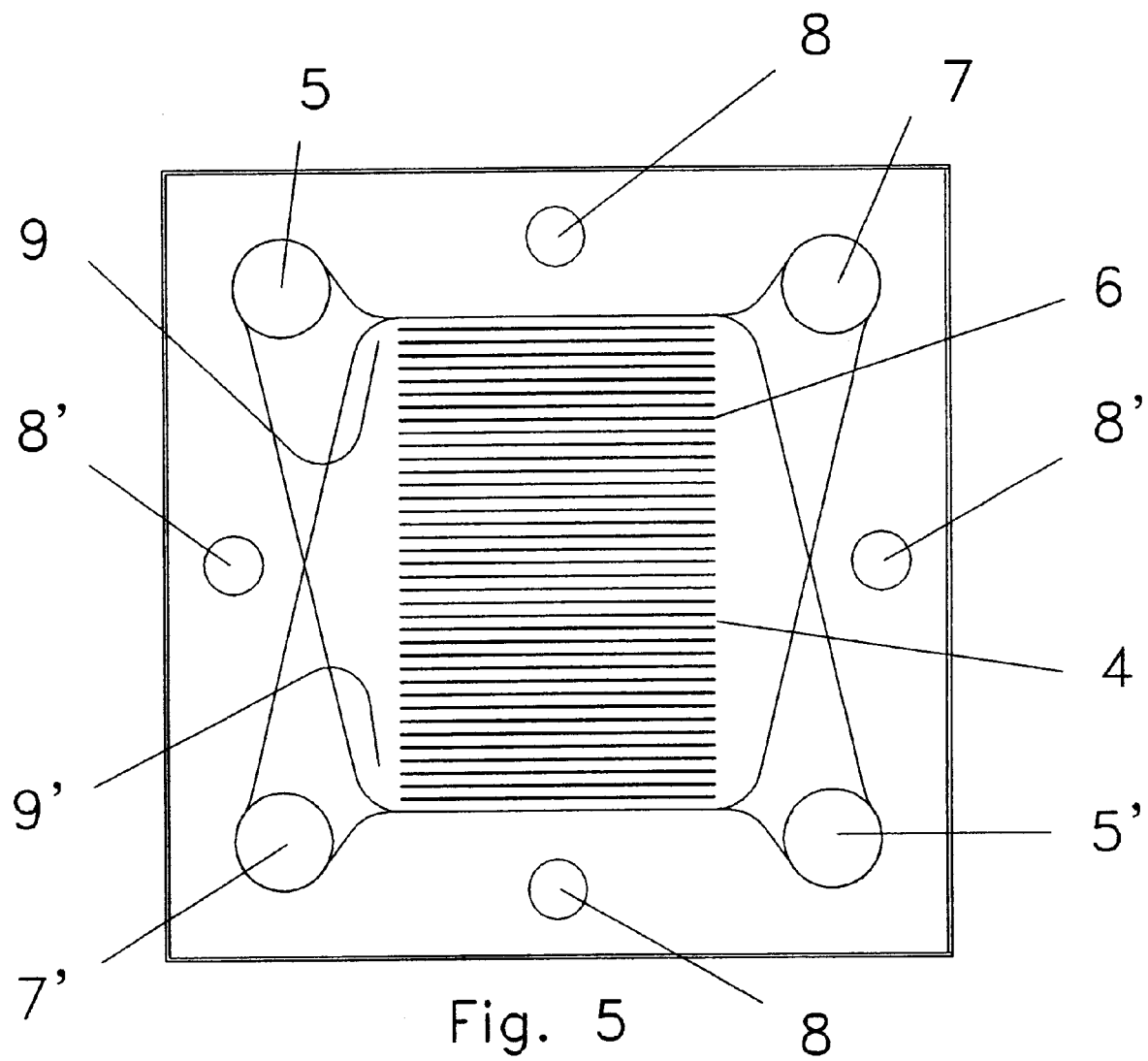
FIG. 5 shows the active surface for the heat transfer. The heat transfer occurs in the overlapping regions of the structurization 9, 9'.
Figure 6:
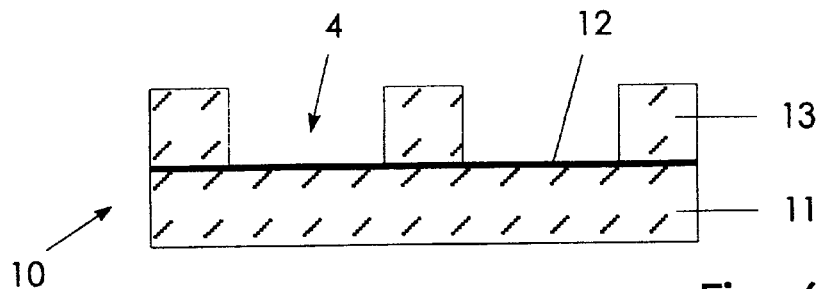
FIG. 6 shows the body in the form of a substrate 11 with a thin metal layer 12 and a plastic cover layer 13, into which the structurization is worked by means of a photolithography method or by means of laser ablation. The plastic layer 13 is removed in certain places during the processing step, so that the metal layer is exposed.
Figure 7:
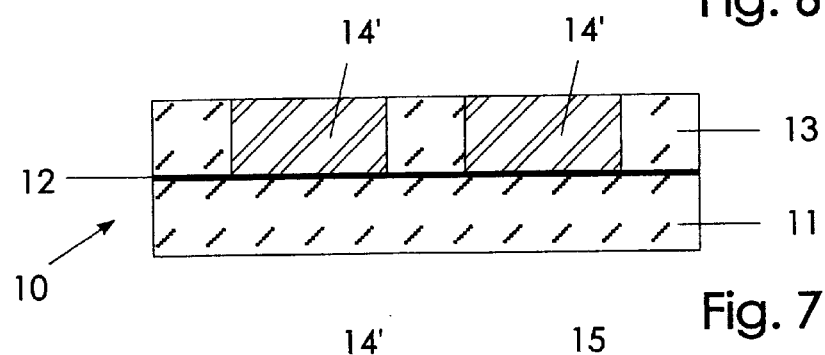
FIG. 7 shows the step of deposition of a galvanic layer 14' on the metal layer in the lengthwise grooves 4. The material is deposited until the grooves are entirely filled up. Next, the surface of the plastic cover layer of the structurized body is metallized by high-vacuum evaporation. The metal layer is indicated by reference number 15 in FIG. 8.
Figure 8:
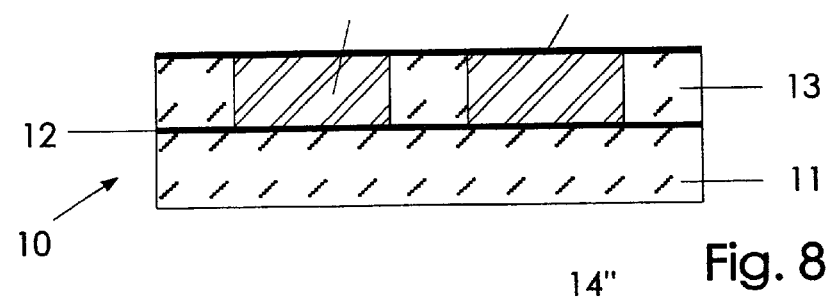
Figure 9:
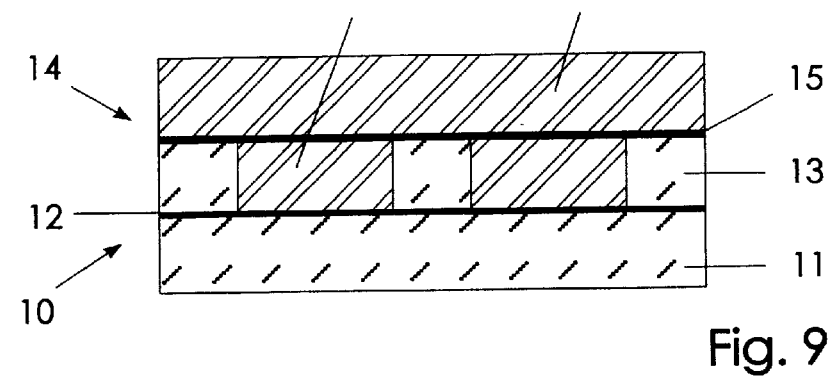

Another galvanic layer 14" is deposited onto the metal layer 15, so that the structurized body 10 is fully formed (FIG. 9). In the event that the structurization is incorporated into a body having no metallic layer, a galvanic layer is deposited onto the surface of the body immediately after the photolithography or x-ray deep lithography process or the laser ablation.

Figure 10:
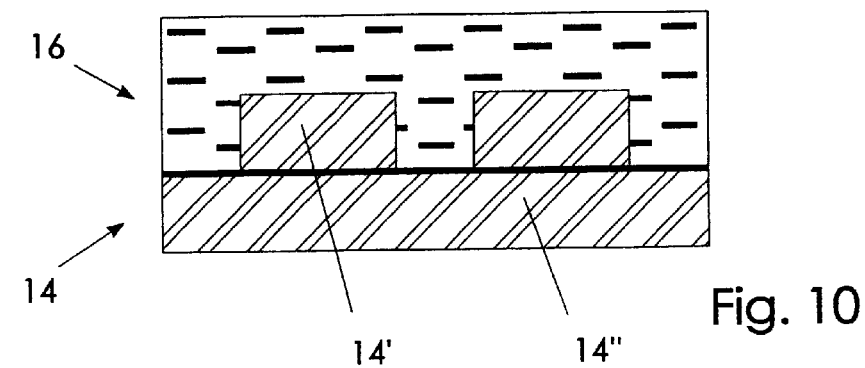

The obtained shaping insert 14 now allows one to produce a large number of individual layers in a forming process. FIG. 10 shows a cross section through the molded piece 16 produced in the metal powder injection molding process, being a negative image of the shaping insert and thus corresponding to the individual layer. After removing the polymer matrix ("debindering") and sintering, the boreholes for conducting the medium and for accommodating the fixation pins can be made in the molded piece 16.

Figure 11:
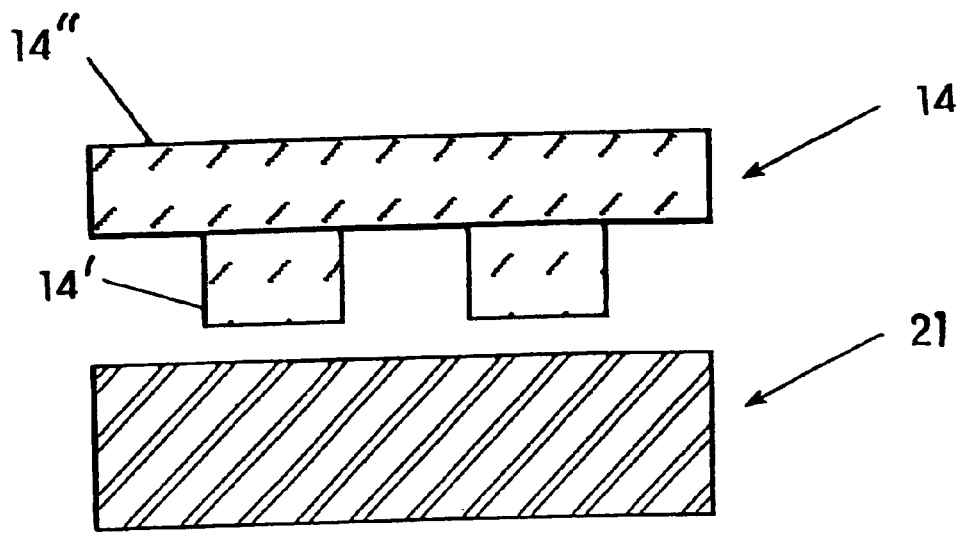

According to the second process variant, the galvanically deposited body 14 serves as an electrode in a spark erosion method, in which the forming material is removed by consecutive, intermittent, nonstationary discharges in a dielectric fluid. FIG. 11 shows the galvanically deposited body 14, as well as the body 21 to be machined by means of the spark erosion method.

Figure 12:
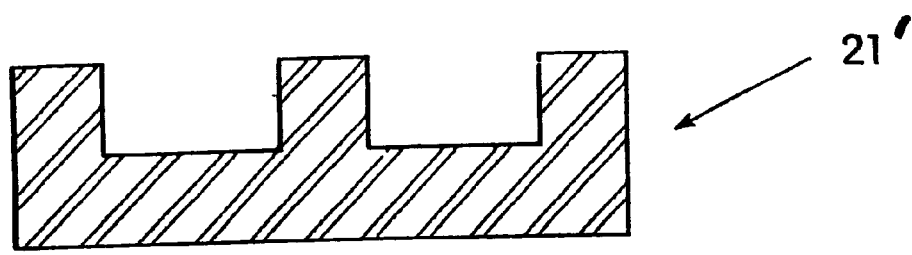

FIG. 12 shows the body 21' obtained after the spark erosion machining.

Figure 13:
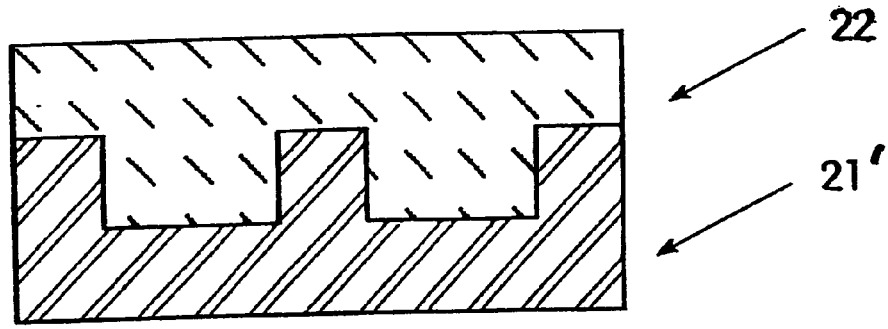

The obtained shaping insert 21' can be used for stamping of metallic layers 22, which find application as individual layers of micro heat exchangers. FIG. 13 shows the step of stamping a metallic body 22 by means of the shaping insert 21'.

Figure 14:
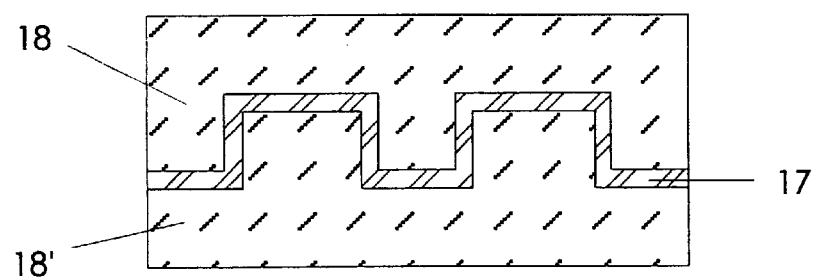

FIG. 14 shows the step of plastic deformation of a metallic foil 17 between two shaping inserts. In this variant of the method according to the invention, two complementary shaping inserts 18, 18' are produced with a structurization, for example, in the form of lengthwise grooves. The metallic foil 17 is placed between the shaping inserts during the stamping process and deformed by exerting a pressing force, similar to deep drawing. The metal foil 17, forming the individual layer, is shape-stable after this structurization step. It forms an individual layer which is structurized both on its top and bottom side.

Figure 15:
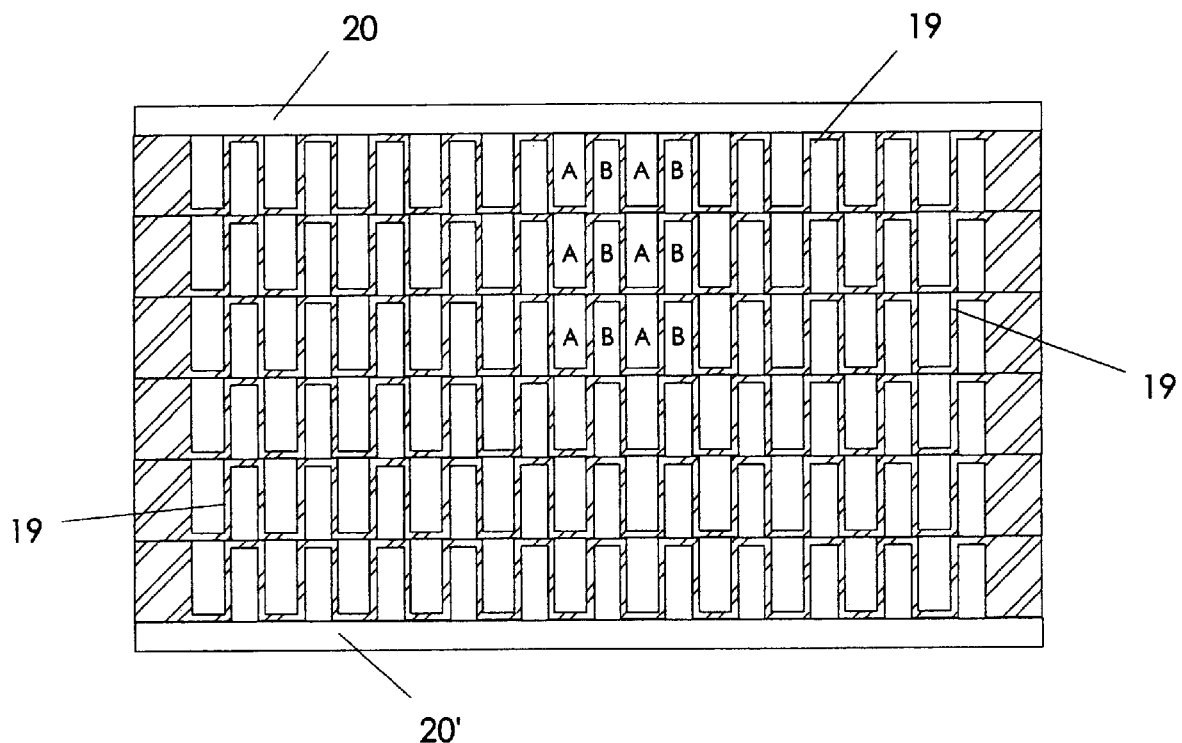

Individual layers structurized on both their top and bottom side can be assembled into heat exchangers which satisfy high thermal demands. FIG. 15 shows a cross section through a heat exchanger in schematic representation, having several stacked individual layers 19 with a meander-type structurization, being covered by an upper and lower layer 20, 20' with fluid connections. In order to intensify the heat transfer, the two fluids alternately flush the side surfaces, in addition to the top and bottom side of each particular fluid channel, which doubles the active surface for the heat transfer. The land structures as well as the fluid channels are arranged directly above each other In FIG. 15, the channels through which the fluid A flows are designated by A and the channels through which the fluid B flows in opposite direction are designated B.

Figure 16:
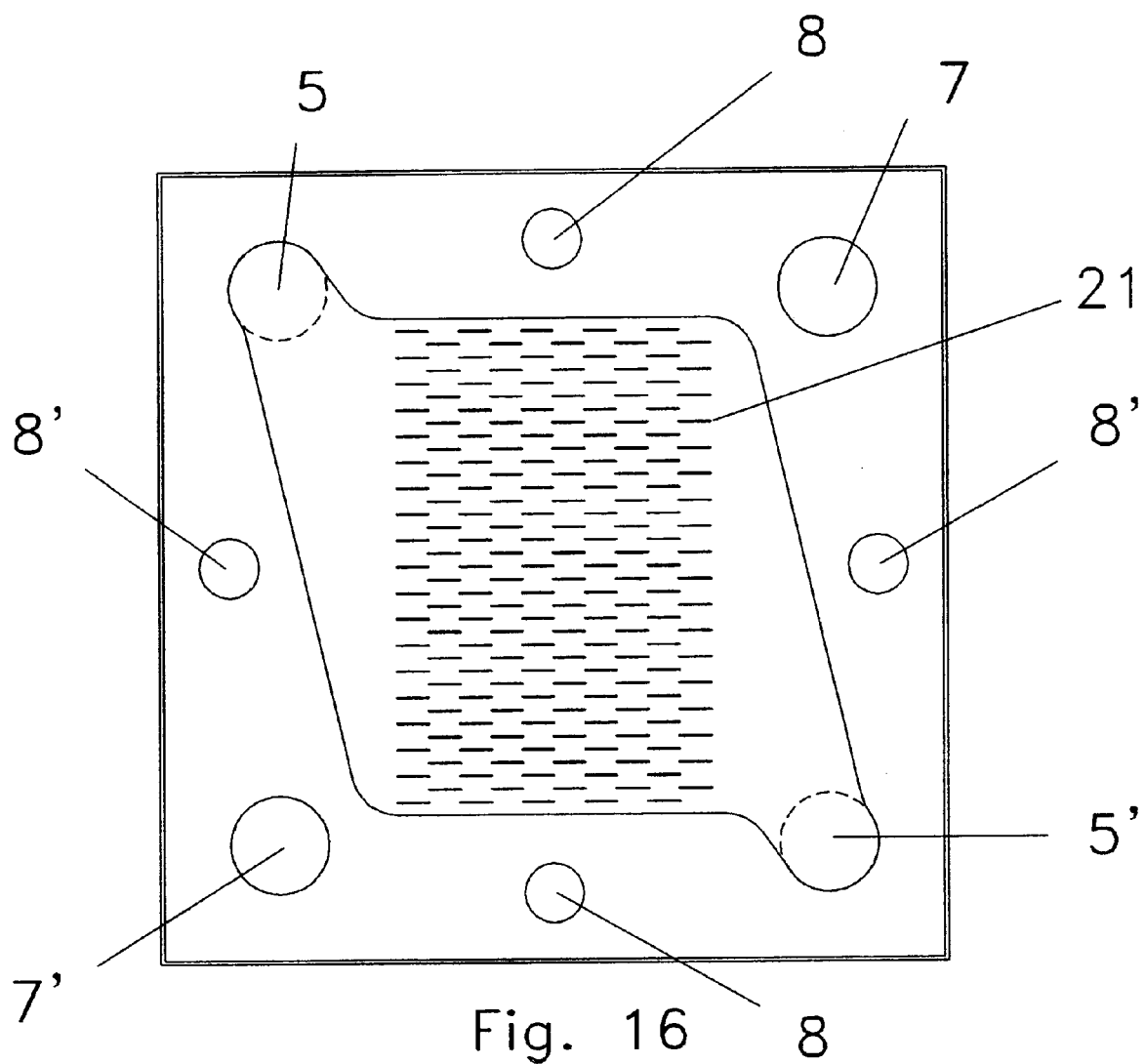

With the method according to the invention, it is possible to create structurizations of various configuration for heat exchangers in a dimension $\leq 10$ μm and a ratio between the height of the structure and its lateral dimensions as much as 100, with high precision. Thus, e.g., it is also possible to produce large numbers of micro heat exchangers for gases, whose individual layers have the land structures 21 shown in FIG. 16, being laterally interrupted and displaced to the side.

1. Method for fabrication of heat exchangers, in which the surfaces of individual metallic layers are structurized and the structurized layers are stacked and joined together to form a microstructure body with channel-like passageways, characterized in that a structurization corresponding to the structurization of the individual layers is incorporated into the surface of a body, a galvanic layer is deposited onto the surface of the structurized body, forming a shaping insert, and the shaping insert is used to mold the individual layers.

2. Method for fabrication of heat exchangers, in which the surfaces of individual metal layers are structurized and the structurized layers are stacked and joined together to form a microstructure body with channel-like passageways, characterized in that a structurization inverse to the structurization of the individual layers is incorporated into the surface of a body, a galvanic layer is formed on the surface of the structurized body, forming a metallic layer structurized inversely to the original structurization, the thus structurized metallic layer serving as an electrode, by means of an electroerosion process a shaping insert structurized inversely to the structurized surface of the electrode is formed in a metal layer, and the shaping insert is used to form the individual layers.

What is claimed is:

1. A method for fabrication of heat exchangers, in which individual metal layers have structured surfaces and the structured metal layers are stacked and joined together to form a microstructure body with channel like passageways comprising the steps of:

a) incorporating a structured image in a surface of a body so as to form a structurized body, wherein said body has a surface structure inverse to said structure of said individual metal layers to be formed;

b) forming a metallic galvanic layer on the surface of the structurized body, said metallic galvanic layer having a surface structure which is inverse to said surface structure of said body, c) electroeroding a metallic mold insert by utilizing said metallic galvanic layer as an electrode, said metallic mold insert after being electroeroded having a surface with a structure which is inverse to said surface of the metallic galvanic layer used as an electrode; and d) forming said individual metal layers of said heat exchanger using said metallic mold insert.

2. A method according to claim 1, wherein said individual metal layers are formed by metal powder injection molding utilizing said metallic mold insert.

3. A method according to claim 1, wherein said individual metal layers are formed by embossing said individual metal layers with said metallic mold insert.

4. A method according to claim 1, wherein said individual metal layers are formed by pressing said metallic mold insert into an embossing material consisting of a metal powder embedded in a polymer matrix.

5. A method according to claim 1, wherein said individual metal layers comprise metal foil which are plastically deformed between two complementary metallic mold inserts.

6. A method according to claim 1, further comprising the step of assembling the individual layers to form a heat exchanger.

7. A method according to claim 1, wherein said body is plastic, and wherein a surface of said plastic body is metallized before said metallic galvanic layer is formed thereon.

* * * * *